Feb. 23, 1965  T. A. BATTEN  3,170,829
GUIDE FOR A TIRE BUILDING MACHINE
Filed April 26, 1962  3 Sheets-Sheet 3
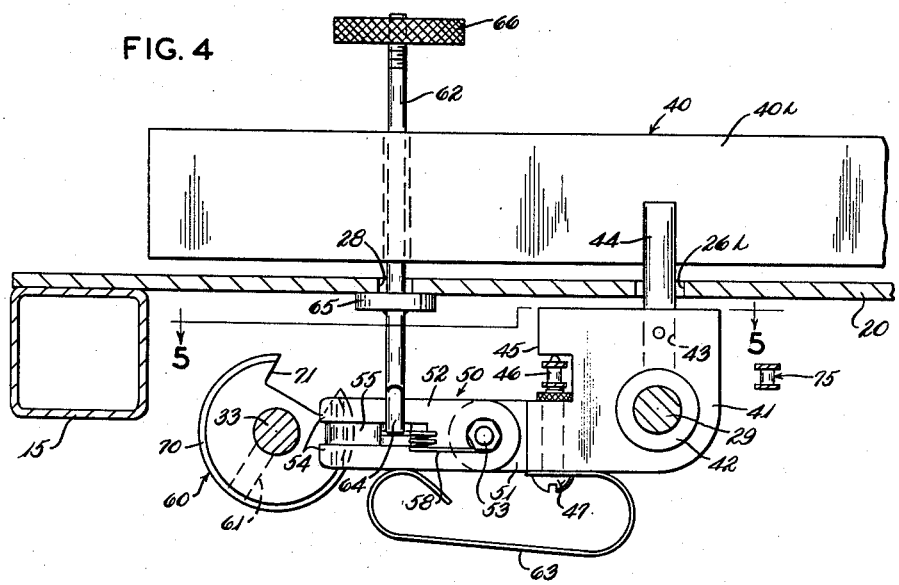
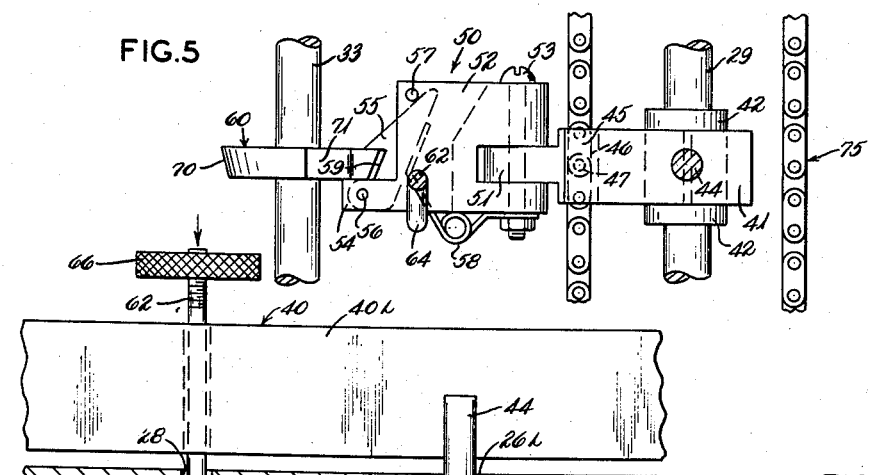
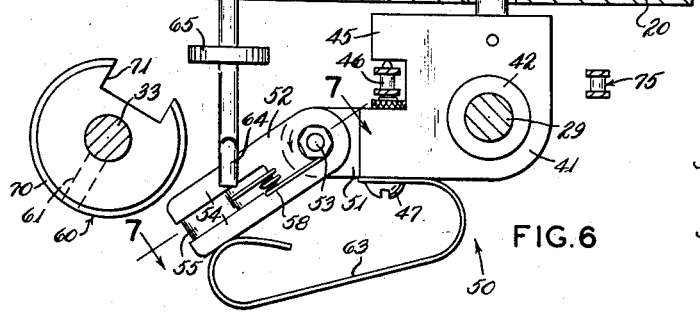
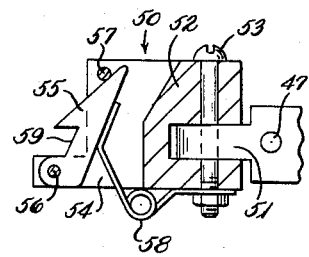

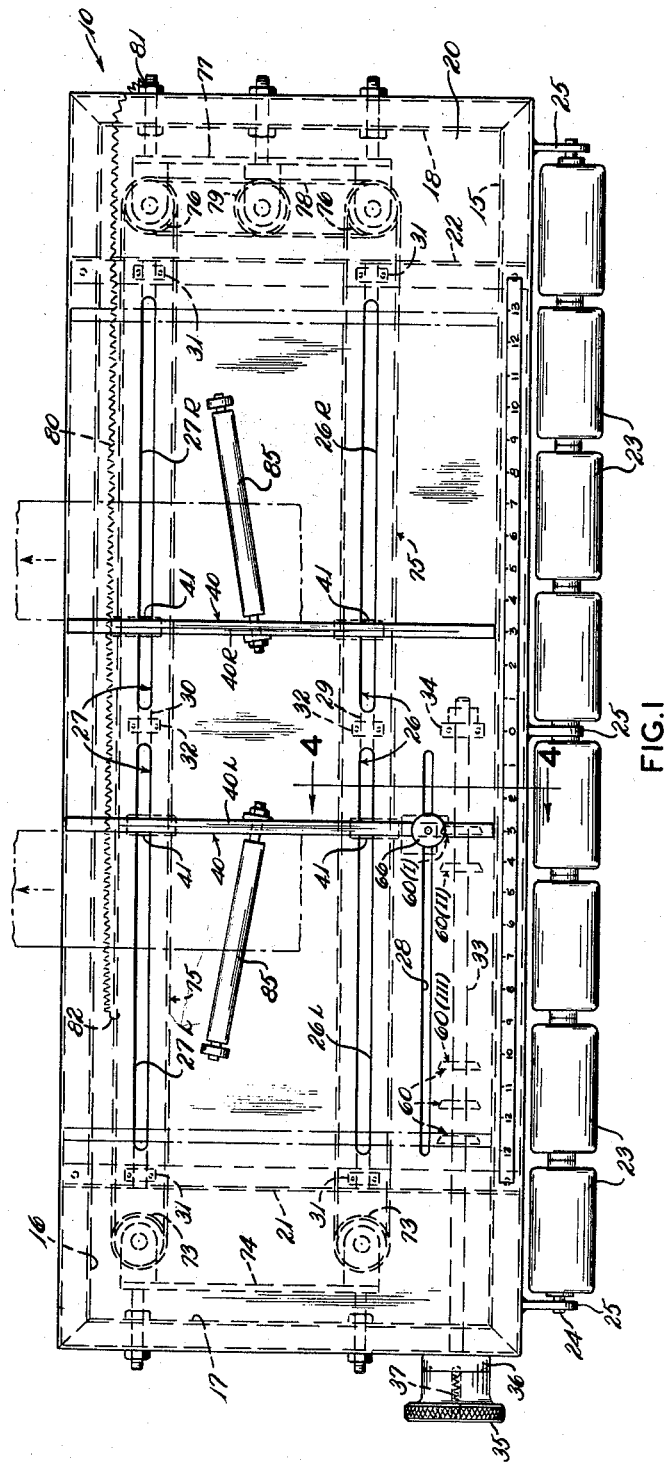
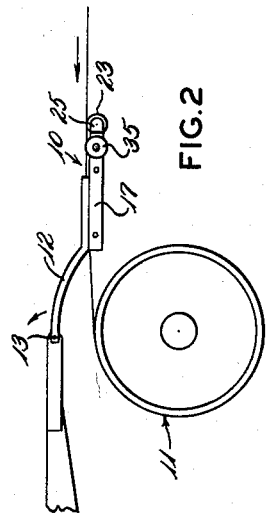

United States Patent Office 3,170,829
Patented Feb. 23, 1965

3,170,829
GUIDE FOR A TIRE BUILDING MACHINE
Thomas Allen Batten, Silver Lake, Ohio, assignor to The Firestone Tire & Rubber Company, Akron, Ohio, a corporation of Ohio
Filed Apr. 26, 1962, Ser. No. 190,397
8 Claims. (Cl. 156—405)

The present invention relates to guides for tire building machines. More particularly, the invention relates to apparatus for delivering varied width flat strips of tire components, such as fillers, reinforce, chafer, sidewalls, etc. onto a substantially flat surface building drum with extreme precision and speed.

Apparatus according to the present invention is generally referred to in the art as being a "servicer," "server," or "guide." Apparatus of this type includes a flat table or plate, generally rectangular, suitably mounted so that the trailing or rear edge may be positioned in operative relation with a building drum (see FIG. 2). On the upper surface of the guide plate are transversely movable guide members, selectively adjustable to various predetermined locations as established by the purpose of the particular flat strip tire component being applied to the drum.

Heretofore, the adjustable fence or guide members have been simultaneously moved transversely of the surface of the guide plate by a chain and sprocket linkage manually actuated by a handle or knob. Various schemes and devices have been provided to locate the guide members in predetermined positions on the plate. For example, in United States Patent No. 1,711,074, the shaft of a driven sprocket has been provided with detent fingers extending radially of the shaft and selectively engaging a spring detent fixed to the plate support. Manual rotation of the sprocket shaft would move from one detent position to the next, thus establishing a desired number of preselected locations for the guide members.

As the complexity of the tire structure per se has increased, the necessity for extreme accuracy in positioning of the guide members for delivery of the flat strip components has become more critical. Also, whereas the prior art guide devices were concerned with accurate placement of perhaps three pairs of flat strip components, the present tires require accurate placement of five or six pairs of components. As the complexity of the operation has increased, so also has there arisen the necessity for speed in shifting the guides from one predetermined position to the next.

Accordingly, the principal object of the present invention is to provide improved guide apparatus for delivering varied width flat strips of tire components onto a tire building drum. Apparatus according to the invention will provide for such delivery with extreme precision of alignment and with speed in shifting for varied width flat strip components. Specific advantages of the present invention will be apparent in view of the following detailed description and the attached drawings.

In the drawings:

FIG. 1 is a top plan view of a guide device according to the invention;

FIG. 2 is a schematic side view, showing placement and orientation of a guide device according to FIG. 1, in operative relation with a tire building drum;

FIG. 4 is an enlarged section, taken substantially as indicated on line 4—4 of FIG. 1, showing the release mechanism, for shifting the guide member pairs from one predetermined position to the next, in the inactive or static condition;

FIG. 5 is a plan view, taken substantially as indicated on line 5—5 of FIG. 4;

FIG. 6 is a view similar to FIG. 4 and showing the release mechanism in the active or dynamic condition; and FIG. 7 is a detail view taken substantially as indicated on line 7—7 of FIG. 6.

Figure 3:
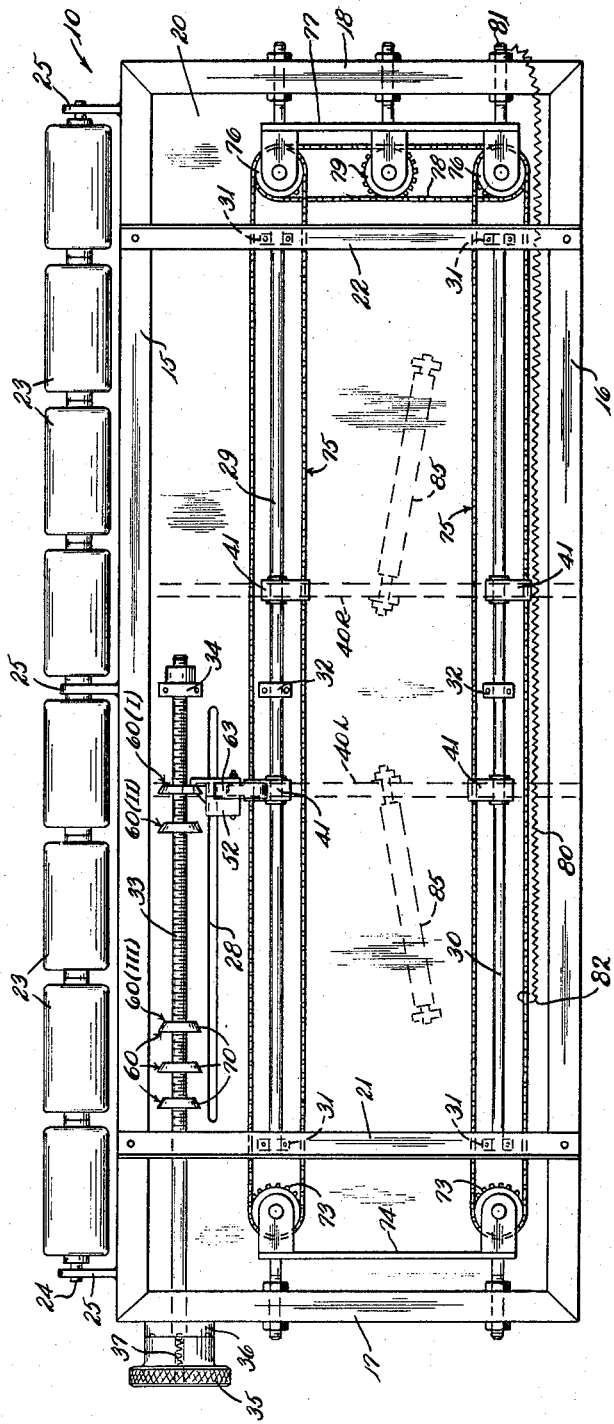
FIG. 3 is a bottom plan view of a guide device according to the invention.

The guide apparatus is indicated generally by the numeral 10. As shown in FIG. 2, the guide 10 is positioned in operative relation to a rotating tire building drum indicated at 11 by an extension bracket 12. The bracket 12 is hinged as at 13 to allow the guide to be lifted away for operator access to the drum.

Referring to FIGS. 1 and 3, the rectangular table of the guide 10 is defined by front, rear, left side and right side frame members 15, 16, 17 and 18, respectively. The upper surface of the table is provided by a rectangular plate 20, suitably slotted as described in detail below. The under surface of the table has two cross ribs 21 and 22 extending between frame members 15 and 16.

On the leading or entry side of the guide 10 are a series of free rotating rollers 23 journaled on an axle 24 supported by a series of flange brackets 25 extending horizontally from the front frame member 15. The rollers 23 guide and support the tire components during passage onto and over the table surface 20.

Extending transversely of the table surface 20 are two sets of double elongated guide slots 26 and 27. The front slot 26 has a left side portion (26L) and a right side portion (26R). The rear guide slot similarly has a left side portion (27L) and a right side portion (27R). Between the front slot 26L and the front frame member 15 is a single elongated release mechanism control slot 28.

Extending transversely beneath the table surface 20 and aligned with each guide slot 26 and 27, are smooth surfaced front and rear guide rods, 29 and 30, respectively. The outer ends of each guide rod are secured by clamps 31 to the cross ribs 21 and 22. The medial portion of each guide rod is secured by a clamp 32 directly to the underside of the table surface 20.

Extending transversely beneath the table surface 20 to the front of and parallel with the control slot 28 is a threaded surface stop adjusting rod 33. The inner end of the adjusting rod is journaled in a support 34 attached to the underside of the table surface 20. The outer end of the adjusting rod extends through the left side frame member 17 and has fastened thereto a selector knob 35. Between the inner face of the selector knob and the frame member 17 is a fixed position selector plate 36 which is suitably marked to indicate calibration of the knob 35, as described in detail below. Within the knob 35 is a spring loaded ball mechanism 37 engaging a series of suitably spaced indentations on the outer face of the selector plate 36.

Extending above the table surface 20, from front to rear, are a pair of guide or fence members 40. The right side guide fence (40R) is carried by two bearing and chain holders 41 slidably mounted one on each guide rod 29 and 30. The left side guide fence (40L) is similarly carried by two holders 41 slidably mounted one on each guide rod 29 and 30.

Referring to FIG. 4, each holder 41 has a hub portion 42, with a bore for receiving a guide rod (29 or 30). Above each horizontal bore is a vertical bore 43 receiving a stud rod 44 extending upwardly through a guide slot (26 or 27) to carry the guide fence 40. Further, each holder 41 is provided with a lateral portion defining a yoke 45 for secure attachment of a drive chain link element 46 as by a bolt and fastener 47. As best seen in FIG. 3, it will be noted that the yoke portions 45 of the holders 41 carrying the right side fence (40R), are oriented toward the rear frame member 16. The yoke portions 45 of the left side holders are oriented in the opposite direction, toward the front frame member 15. By this arrangement the drive chain link elements 46, as described in further detail below, can be attached in dual fashion to both sets of fence holders 41 without interference.

Referring again to FIGS. 4–7, one of the guide holders 41, at the left front corner of the table for carrying the front end of guide fence 40L, is specially adapted for controlling release or actuation of the improved guide positioning mechanism indicated generally at 50. Extending laterally and forwardly from the control guide holder 41 is a clevis 51 for movable mounting of a latch holder 52 as by a bolt and fastener 53.

The forward end of the latch holder 52 is bifurcated to provide two segments 54 for receiving and holding a latch bar 55. As best seen in FIG. 7, each segment 54 is generally "L-shaped." Adjacent the end of the leg of each segment, near the front inside corner of the holder 52, are sockets for mounting a pin 56 providing the pivot point for the latch bar 55. Near the front outside corner of the holder 52 are similar sockets for mounting a pin 57 providing a stop for movement of the latch bar. The latch bar is normally biased toward stop pin 57 by a coil spring 58 secured to the side of holder 52 by the fastener 53.

As best seen in FIG. 5, the dog or catch 59 of the latch bar 55 selectively engages the peripheral surface of a round or circular keeper or stop member indicated at 60 threaded on the control rod 33 and secured as by a fastener 61. The latch holder 52 is selectively pushed downwardly, rotating about the pivot provided by fastener 53, for disengaging the latch bar from a stop 60 by a control release plunger 62. For recovery of the latch holder 52 to the normal or static condition, that is, to permit the latch bar 55 to engage a stop 60, a leaf spring 63 may be secured to the under surface of the holder 41 as by the fastener 47. The resilient end of the spring 63 contacts the under surface of the latch holder 52 and exerts an upward bias.

As best seen in FIGS. 4 and 6, the control plunger 62 has a hook-shaped lower end portion 64 to ensure contact with the upper surface of the latch holder 52. The medial portion of the plunger 62 has a collar 65, suitably located so that contact with the underside of the table surface 20 will stop upward movement of the plunger 62 under the bias exerted by spring 63. The upper portion of the plunger 62 extends through slot 28 and the guide fence 40L and terminates with a knob 66 providing a flat surface for manual depression of the plunger 62.

Referring to FIGS. 1 and 3, the control rod 33 carries thereon a plurality or series of stop members 60. As best shown in FIGS. 4 and 5, the peripheral surface 70 of each stop 60 has a conical bevel or taper, interrupted by a short relieved portion or control notch 71. The stop bevel surface 70 is provided so that the latch bar 55 may change position relative to a stop 60 in one direction (from bottom to top in FIG. 5) without restriction, while movement in the opposite direction will result in the latch dog 59 engaging the radial edge 70 of the control stop 60. The stop notch 71 is provided so that depending upon radial orientation, the latch bar 55 may change position in either direction, without restriction.

As best shown in FIG. 3, a feature of the present invention is that the several stop members 60 may be accurately and precisely located longitudinally on the control rod 33. Further, each stop 60 may be adjusted radially of the rod 33 so that the radial notch 71 will by-pass the dog 59 of the latch bar. The control stops 60 are thus adjustable means for establishing a plurality of predetermined positions for the movable fence guides 40.

The fence guide members 40 are operatively connected for simultaneous movement toward and away from each other. Reference has been made above to the chain link elements 46 secured to the fence holders 41. As best shown in FIG. 3, there are two sprockets 73 extending inwardly from a sprocket bracket 74 adjustably attached to the left side frame member 17. The four chain links 46 previously described are components of two continuous chain linkages indicated at 75. Each chain 75 is trained around a sprocket 73, across beneath the table 20 and around double sprockets 76 on the right side. The sprockets 76 extend inwardly from a sprocket bracket 77 adjustably attached to the side frame member 18. The two chains 75 are interconnected by short chain lengths 78, preferably through an intermediate double sprocket 79 carried by bracket 77 and adjustable for chain tightening purposes.

During a tire building operation, the guide fence members 40 may be set in an inboard position; that is, the guides 40 are moved toward each other to the inside ends of the slots 26 and 27. A feature of the chain drive linkage just described is that the guides may be located by the operator with facility and ease merely by depressing the plunger 62 with one hand and moving the right-hand guide (40R) with the other hand.

When the guide fence members 40 are in the inboard position, means are provided to urge the guides away from each other. As shown, a long coil spring 80 may be used to provide a force normally biasing the guides 40 away from each other and their inboard position. The outer end of a spring means 80 is secured to the frame as indicated at 81. The other end of the spring is attached at a suitable location as indicated at 82 to a link element of a drive chain 75.

In operation, the guide fence members 40 are moved to an inboard position until the latch bar 55 engages the radial edge 70 of a control stop, usually the innermost stop, indicated as 60(I) in FIG. 3. The spring means 80 will be stretched during this movement. The orientation of the next control stop, indicated as 60(II) establishes the next position of the guides 40. To cause the outward movement of the guides, the control knob 35 is indexed until the radial notch 71 of stop 60(I) releases the latch bar 55. When released, the latch bar 55 (and the fence guides 40) move outwardly toward control stop 60(II). If stop 60(II) is oriented so that the radial edge 70 engages the latch bar 55, the outward movement will stop. If the radial notch 71 of stop 60(II) is aligned with the notch 71 of stop 60(I), the outward movement will continue toward the next control stop, indicated at 60(III).

It will be apparent that any desired number of control stops 60 may be carried by rod 33. The orientation of each stop 60 is readily adjustable to establish predetermined positions for the guides 40, permitting of great flexibility and versatility in use of the apparatus 10 during a tire building operation.

Referring to FIG. 1, it will be noted that each guide fence member 40 carries thereon a laterally extending roller member 85. As shown, the axis of each roller member 85 is angularly inclined with relation to the outer surface of each guide 40. Use of rollers 85 in this manner is an additional feature ensuring that the tire components will accurately follow the guide surfaces as they move over the table 20 toward the building drum 11.

While a preferred form of the invention has been shown and described in sufficient detail to enable one skilled in the art to practice the invention, it will be apparent that various features and modifications of the invention could be used in guides for tire building machines without departing from the true spirit of the invention. Therefore, the scope of the invention should be limited solely by the scope of the attached claims.

What is claimed is:

1. In a guide (10) for tire building machines, said guide having a plate (20) adapted to be positioned in operative relation with a tire building drum (11) and a pair of guide fence members (40) connected for simultaneous movement toward and away from each other transversely over said plate, adjustable stop means (60) for establishing a plurality of predetermined positions for said guide members, latch means (55) carried by one of said fence members to selectively engage said adjustable stop means, and means (80) normally biasing said fence members for movement in one direction and said latch means into selective engagement with one of said adjustable stop means.

2. Apparatus according to claim 1 in which said adjustable stop means are a series of control stop elements positioned longitudinally on a selectively rotatable control rod (33), each said stop element having a radial edge (70) for engaging said latch means and a radial notch (71) for by-passing said latch means.

3. Apparatus according to claim 1 in which the means for simultaneous movement of said guide fence members comprises two continuous chains (75), each chain being connected to opposite ends of said fence members and said means for normally biasing said fence members for movement in one direction consists of a long coil spring having one end attached to said plate and the other end attached to one of said chains.

4. Apparatus according to claim 2 in which the radial edge of each said stop element is defined by a taper surface permitting said latch means to move thereby in one direction without restriction irrespective of the position of said radial notch.

5. Apparatus for guiding strip components onto a tire building drum, comprising: a rectangular frame having a plate surface (20) with a rear edge positioned in operative relation with said building drum, said surface having transversely extending front and rear parallel guide slots (26 and 27) and a single control slot (28) parallel to and in front of said front guide slot; front and rear guide rods (29 and 30) extending transversely of said plate surface beneath said guide slots, each said guide rod being smooth surfaced and attached to said frame; a control rod (33) beneath said plate surface and extending parallel and to the front of said guide slot; four guide holders (41) movably mounted two on each guide rod and having support elements (44) extending upwardly through each guide slot above the plate surface; two guide fence members (40) extending front and to rear mounted on said support elements, one of said guide holders located nearest to said control rod having latch means (55) thereon; a series of control stops (60) positioned longitudinally on said control rod, each said control stop having a peripheral portion adapted to selectively engage said latch means; means for simultaneously moving each of said guide holders toward and away from each other; means for biasing said guide holders away from each other; and means to rotate said control rod so that said control stops are selectively disengaged from said latch means and said guide holders move away from each other.

6. Apparatus for guiding strip components onto a tire building drum, comprising: a rectangular frame having a plate surface (20) with a rear edge positioned in operative relation with said building drum, said surface having transversely extending front and rear parallel guide slots (26 and 27) and a single control slot (28) parallel to and in front of said front guide slot; front and rear guide rods (29 and 30) extending transversely of said plate surface beneath said guide slots, each said guide rod being smooth surfaced and attached to said frame; a control rod (33) beneath said plate surface and extending parallel and to the front of said guide slot; four guide holders (41) movably mounted two on each guide rod and having support elements (44) extending upwardly through each guide slot above the plate surface; two guide fence members (40) extending front and to rear mounted on said support elements, one of said guide holders located nearest to said control rod having latch means (55) thereon; a series of control stops (60) positioned longitudinally on said control rod, each said control stop having a radial edge portion adapted to selectively engage said latch means; means for simultaneously moving each of said guide holders toward and away from each other; coil spring means having one end attached to said frame and the other end attached to said means for simultaneously moving said guide holders normally urging said guide holders away from each other; and means to rotate said control rod so that said control stops are selectively disengaged from said latch means and said guide holders move away from each other.

7. Apparatus for guiding strip components onto a tire building drum, comprising, a plate adapted to be positioned in operative relation with said tire building drum, a pair of guide members transversely movable over said plate, means to simultaneously move said guide members toward and away form each other, latch means connected to one of said guide members beneath said plate, a series of control means selectively engaging said latch means, and means to bias said guide members for movement in one direction and said latch means into engagement with one of said control means.

8. Apparatus for guiding strip components onto a tire building drum, comprising, a plate adapted to be positioned in operative relation with said tire building drum, a pair of guide members transversely movable over said plate, means to simultaneously move said guide members toward and away from each other, and roller means (85) extending laterally from the outer surface of each of said guide means and being angularly inclined so as to direct said strip components against said outer surface during movement across said table onto said building drum.

References Cited in the file of this patent

UNITED STATES PATENTS

| | | |
|---|---|---|
| 1,711,074 | Wikle | Apr. 30, 1929 |
| 1,717,845 | Irrgang | June 18, 1929 |
| 1,738,503 | Stevens | Dec. 3, 1929 |
| 1,867,370 | Maynard | July 12, 1932 |
| 2,039,532 | Heston | May 5, 1936 |
| 2,041,990 | Breth et al. | May 26, 1936 |
| 2,626,651 | Manning et al. | Jan. 27, 1953 |